(12) United States Patent
Kim et al.

(10) Patent No.: US 7,433,604 B1
(45) Date of Patent: Oct. 7, 2008

(54) DIRECT-DETECTION OPTICAL DIFFERENTIAL 8-LEVEL PHASE SHIFT KEYING (OD8PSK) FOR SPECTRALLY EFFICIENT TRANSMISSION

(75) Inventors: Cheolhwan Kim, Orlando, FL (US); Yan Han, Orlando, FL (US); Guifang Li, Oviedo, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 526 days.

(21) Appl. No.: 11/168,154

(22) Filed: Jun. 28, 2005

Related U.S. Application Data

(60) Provisional application No. 60/589,922, filed on Jul. 21, 2004.

(51) Int. Cl.
*H04B 10/04* (2006.01)
(52) U.S. Cl. .................................. 398/188; 398/183
(58) Field of Classification Search ............ 398/183, 398/188
See application file for complete search history.

(56) References Cited

U.S. PATENT DOCUMENTS

2004/0081470 A1* 4/2004 Griffin ..................... 398/188

OTHER PUBLICATIONS

Ohm et al., Differential optical 8-PSK with direct detection (8-DPSK/DD), ITG-Fachtagung, Leipzig, Germany, May 2003, pp. 177-181.*

Ohm; Optical 8-DPSK and receiver with direct detection and multi-level electrical signals; Advanced Modulation Formats, 2004 IEEE/LEOS Workshop on; Jul. 1-2, 2004 pp. 45-46.*

Ohm et al.; Dispersion Compensation and Dispersion Tolerance of Optical 40 Gbit/s DBPSK, DQPSK and 8-DPSK Transmission Systems with RZ and NRZ Impulse Shaping, ITG-Fachtagung, Leipzig, Germany, May 2004.*

Han, Y. et al., "Simplified Receiver Implementation for Optical Differential 8-level Phase-Shift Keying", Electronics Letters, vol. 40, No. 21, Oct. 14, 2004.

Han, Yan and Guifang Li, "Sensitivity Limits and Degradations in OD8PSK", IEEE Phonetics Technology Letters, Aug. 24, 2004.

Kim, C and Li, G., "Direct Detection Differential 8-level Phase Shift Keying (OD8PSK) for Spectrally Efficient Transmission", Optical Society of America (2004).

* cited by examiner

*Primary Examiner*—Jason Chan
*Assistant Examiner*—Nathan M Curs
(74) *Attorney, Agent, or Firm*—Brian S. Steinberger; Phyllis K. Wood; Law Offices of Brian S. Steinberger, P.A.

(57) ABSTRACT

Efficient systems, devices, apparatus and methods to generate, transmit and detect differentially encoded 8-level phase-modulated optical signals for spectrally efficient optical communication systems is invented. It includes an electrical encoder and an optical encoder for generation of differentially encoded 8-level phase-modulated optical signals and optical demodulators and balanced detectors for detection of the optical signals. The optical signals are transmitted through optical fiber links or air. The electrical encoder maps three independent data channels into three differentially-encoded data sequences. In the optical encoder, the encoded data sequences from the electrical encoder drive optical modulators to generate differentially-encoded 8-level phase modulated optical signals at a symbol rate equal to the bit rate of each input data channel. After transmission through optical fiber, the optical signals are demodulated optically and the original data are recovered by the balanced detectors with direct detection.

16 Claims, 4 Drawing Sheets

DIRECT-DETECTION OPTICAL DIFFERENTIAL 8-LEVEL PHASE SHIFT KEYING (OD8PSK) FOR SPECTRALLY EFFICIENT TRANSMISSION

This application claims the benefit of priority to U.S. Provisional patent application Ser. No. 60/589,922 filed on Jul. 21, 2004, and was supported by DARPA under contract number DAAD1702C0097 and the National Science Foundation (NSF) under grants 0327276, 0114418, 9980316 and 9896141.

FIELD OF THE INVENTION

The invention relates to generating, distributing, and detecting optical signals and in particular to systems, devices, apparatus, and methods of generating, distributing and detecting optical signals for transmission of data in ultra high capacity optical transmission mediums.

BACKGROUND AND PRIOR ART

Ultra high capacity optical transmission systems require high spectral efficiency due to finite bandwidth of optical fibers. High spectral efficiency not only leads to larger aggregate capacity but also provides better tolerance to chromatic dispersion and polarization-mode dispersion (PMD). Spectral efficiency of modulation formats can be increased by using multilevel modulation. A preference for spectral efficient transmission systems is direct detection to allow simple receiver structures free of local oscillators and polarization control.

Optical differential quadrature phase shift keying (DQPSK) with direct detection reduces the spectral width by one half. DQPSK is a digital modulation technique commonly used with cellular systems. Motorola's CyberSurfr cable modem uses DQPSK to carry data upstream from the subscriber's computer to the Internet on a narrower frequency band than standard QPSK. Narrower bands allow more upstream channels, so the CyberSurfr has additional noise-free channels to choose from when it's installed. High spectral efficiency not only leads to larger aggregate capacity, but also provides better tolerance to chromatic dispersion and polarization mode dispersion (PMD). Direct detection on the other hand, allows simple receiver structures free of local oscillators and polarization control. Significant increase in chromatic dispersion tolerance and robustness against fiber nonlinearities in optical DQPSK transmission have been demonstrated while allowing simple direct detection.

For further spectral efficiency improvements, an 8-level amplitude and phase-shift keying (8-APSK) with direct detection combines binary amplitude-shift keying and DQPSK. This approach is a straightforward combination of two well-known modulation formats, directly yielding three binary output data sequences identical to the three input data sequences.

In single-channel 8-APSK systems, the system performance is mainly limited by different amounts of self-phase modulation (SPM) accumulated for bits with two different amplitudes. This limitation due to SPM can be mitigated through post-transmission nonlinear phase compensation for single channel systems. However, the effectiveness of post-transmission nonlinear phase compensation is limited for multi-channel systems as inter-channel cross-phase modulation (XPM) becomes major transmission impairment. Since inter-channel XPM increases with the increase of spectral efficiency (decrease of channel spacing), an 8-level modulation formats that is robust to XPM is needed. Furthermore, in order to make direct-detection more tolerant to both SPM and XPM, constant-amplitude 8-level modulation format is required.

The apparatus, system and method of the present invention is a practical implementation of constant-intensity optical differential 8-level phase-shift keying (OD8PSK) with direct detection for high-capacity spectrally-efficient fiber-optic transmission. Electrical encoding and optical encoding/modulation schemes preserve the same simplicity of received architectures based on interferometric demodulation and direct detection, directly yielding three binary output data sequences identical to the three input data sequences. The present invention includes three different optical encoding/modulation schemes and the corresponding electrical encoders.

SUMMARY OF THE INVENTION

A primary objective of the present invention is to provide an efficient systems, apparatus, devices and methods to generate, transmit and detect differentially encoded 8-level phase-modulated optical signals for spectrally efficient optical communication systems.

The preferred embodiment of the present invention provides an optical differential 8-level phase-shift keying optical transmission system spectrally efficient transmission of a data sequence. The optical transmission system includes an encoder for differentially encoding the data sequence to produce a differentially encoded optical signal using optical differential 8-level phase shift keying, an optical transmission medium for transmitting the differentially encoded optical signal, and an optical demodulator and decoder for receiving the transmitted differentially encoded optical signal to recover the data sequence.

The system encoder includes an electrical encoder to encode the data sequence to produce a differentially encoded binary data stream, and an optical phase modulator for receiving and modulating said differentially-encoded binary data stream on an optical carrier with an encoded phase difference of $\pi/4$. The electrical encoder maps three independent data channels into three differentially-encoded data sequences. In the optical encoder, the encoded data sequences from the electrical encoder drive optical modulators to generate differentially-encoded 8-level phase modulated optical signals at a symbol rate equal to the bit rate of each input data channel.

After transmission through the optical transmission medium, an optical coupler divides the differentially encoded optical signal and optical demodulators receive and optically demodulate the divided differentially encoded optical signal and a detector recover the data sequence from the demodulated differentially encoded optical signal.

Further objects and advantages of this invention will be apparent from the following detailed description of the presently embodiments which are illustrated schematically in the accompanying drawings.

DESCRIPTION OF THE PREFERRED EMBODIMENTS

Figure 1:
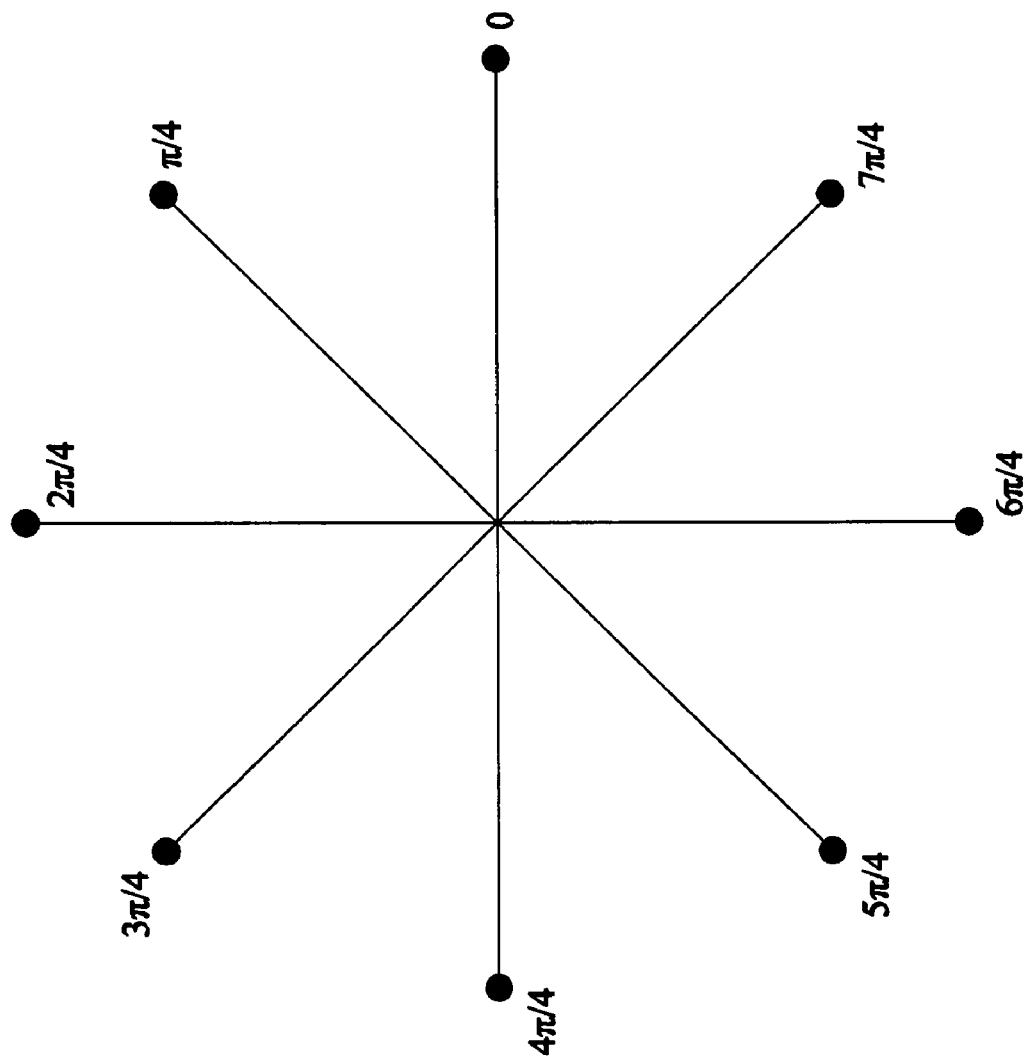
FIG. 1 shows the eight differential phases used for encoding according to the present invention.

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

The following is a list of reference numerals used to identify components in the drawings and the corresponding description.

| 100 | OD8PSK transmission system |
|---|---|
| 110 | electrical encoder |
| 120 | optical encoder |
| 130 | differentially encoded optical signal |
| 140 | optical transmission medium |
| 150 | optical demodulators |
| 200 | MZ interferometer |
| 210 | first arm |
| 212 | first demodulator, first arm |
| 214 | first detector, first arm |
| 216 | second demodulator, first arm |
| 218 | second detector, first arm |
| 220 | second arm |
| 222 | first demodulator, second arm |
| 224 | first detector, second arm |
| 226 | second demodulator, second arm |
| 228 | second detector, second arm |
| 229 | XOR gate |
| 300 | MZ interferometer |
| 310 | first arm |
| 320 | second arm. |
| 312 | first optical demodulator |
| 314 | first detector |
| 316 | sum/addition |
| 322 | second demodulator |
| 324 | second detector |
| 326 | difference/subtract |
| 400 | optical encoder - first embodiment |
| 410 | laser source |
| 430 | first modulator (I) |
| 440 | second modulator (Q) |
| 450 | third modulator (D) |
| 500 | electrical encoder |
| 600 | optical encoder - second embodiment |
| 610 | first modulator |
| 620 | second modulator |
| 630 | third modulator |
| 700 | optical encoder - third embodiment |
| 710 | first modulator, upper arm |
| 720 | second modulator, upper arm |
| 730 | first modulator, lower arm |
| 740 | second modulator, lower arm |

Figure 2:
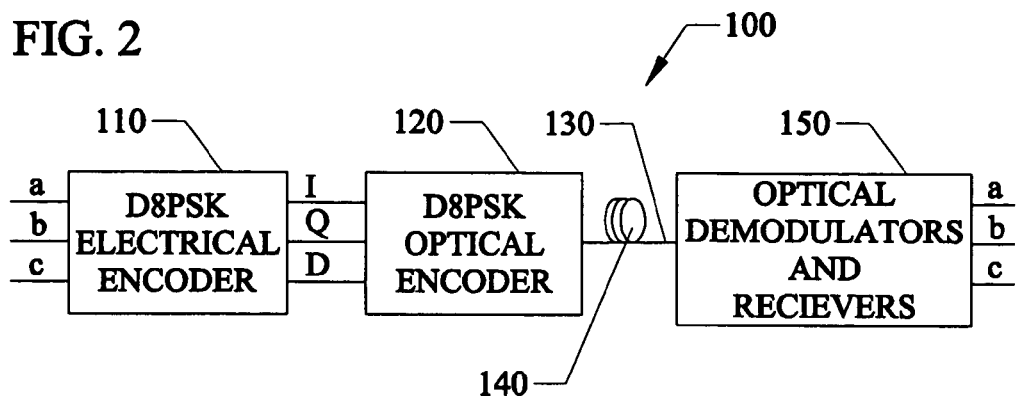
FIG. 2 is a schematic of a novel optical differential 8-level phase-shift keying transmission system according to the present invention.

In optical differentiation 8-level phase-shift keying (OD8PSK) modulation format, eight differential phases between successive bits can have a value of 0, $\pi/4$, $\pi 2$, $3\pi/4$, $5\pi/4$, $6\pi 4$, or $7\pi/4$ as shown in FIG. 1. Each encoded symbol carries three bits of information and the symbol rate is one third of the total bit rate. A schematic view of OD8PSK transmission system 100 is shown in FIG. 2. It comprises an electrical encoder 110, an optical encoder 120 to produce a differentially encoded optical signal 130 for transmission through an optical transmission medium 140, and combined optical demodulators and balanced optical detectors 150.

Decoding Optical Differential 8-Level Phase Shift Keying

Figure 3:
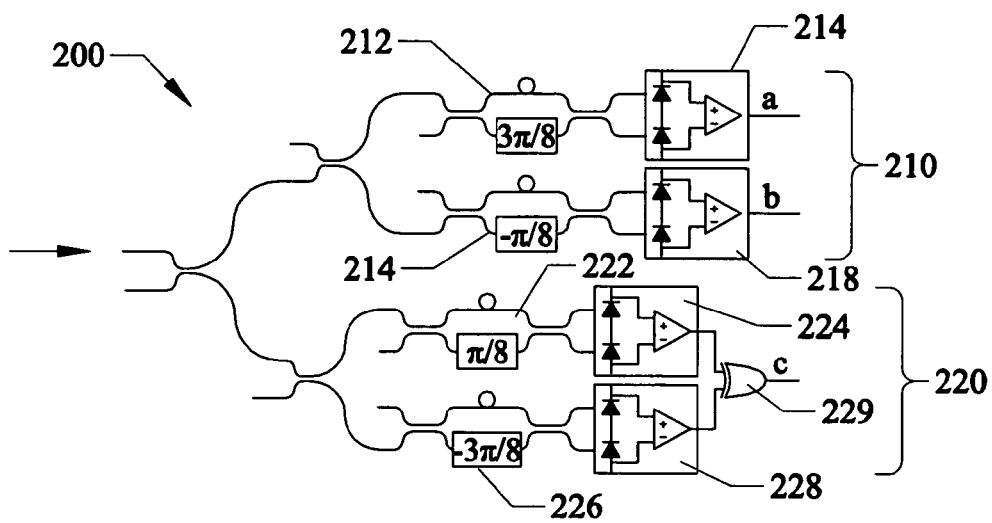
FIG. 3 illustrates a structure of optical demodulators and detectors used in the system shown in FIG. 2 according to a first embodiment of the invention.

For the decoding of OD8PSK modulation format, two embodiments can be used. In the first decoding embodiment, the interferometer 200 includes four optical one-bit delayed Mach-Zehnder (MZ) demodulators 212, 216, 222, and 226 and four balanced detectors 214, 218, 224, and 228 for decoding the OD8PSK encoded signals. The structure of the optical demodulators and detectors is shown in the diagram of FIG. 3. As shown, the incoming differentially encoded optical signal is divided into two optical signals at a first optical coupler (not shown) for the two arms of the optical demodulator. The two optical signals are further divided to produce separate optical signal for each of the four one-bit delayed optical MZ demodulator. In a preferred embodiment an optical 3 dB coupler (not shown) is used for dividing the incoming differentially encoded optical signal into two optical signals for the two arms 210, 220. Two additional optical 3 dB couplers (not shown), one in each arm 210, 220, further divides the two optical signal into four optical signals to be demodulated.

Each optical demodulator is a one-bit delayed Mach-Zehnder interferometer (MZI) with a phase shift of $3\pi/8$, $-\pi/8$ and $\pi/8$, and $-3\pi/8$ between two arms 210, 220, respectively, of the interferometer 200. A balanced detector is used after each optical demodulator to detect the demodulated signal. The demodulators are arranged so that the original input data are recovered directly from the output signals of the receivers. Two input data channels, a and b, are recovered directly at the first arm 210 of the interferometer 200 while the third input data channel, c, is recovered from two balanced receivers, 222 and 224, through an XOR gate 226, as shown in the second arm 220 in FIG. 3.

Figure 4:
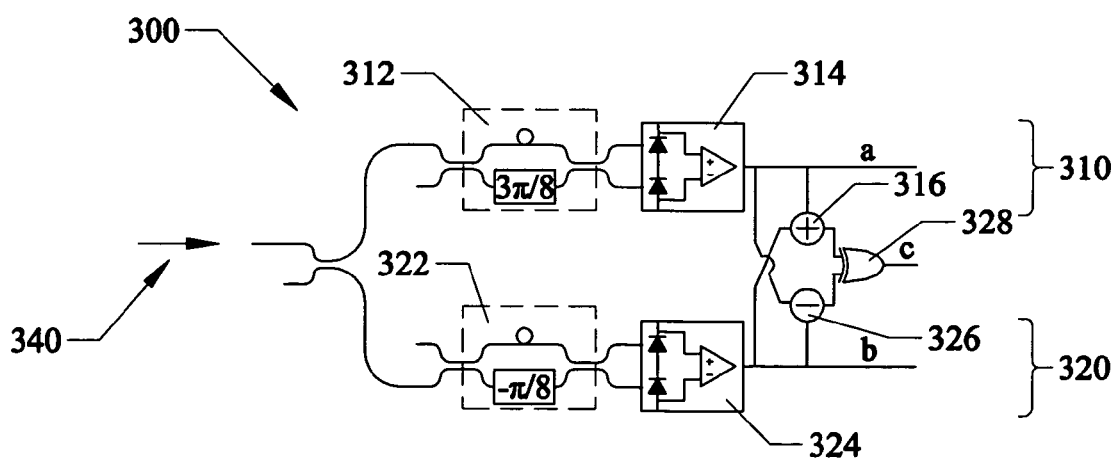
FIG. 4 illustrates another structure of optical demodulators and detectors used in the system shown in FIG. 2 according to a second embodiment of the invention.

In the second decoding embodiment shown in FIG. 4, two optical one-bit delayed MZ demodulators 312, 322 and two balanced detectors 314, 324 are used to decode OD8PSK encoded signals. Each optical demodulator 312, 322 is a one-bit delayed Mach-Zehnder (MZ) interferometer with a phase shift of $-\pi/8$, $3\pi/8$ between two arms 310, 320 of the MZ interferometer 300. A balanced detector 314, 324 is used after each optical demodulator 312, 322 to detect the demodulated signal. In this demodulation scheme, the two original input data, a and b, are recovered directly from the output signals of the receivers. The third input data channel, c, is through electrical processing of the output signals of the receivers. The electrical processing includes addition 316 and subtraction 326 of the output signals to generate $c_1$ and $c_2$, respectively. Then the third input data channel, c, is recovered from $c_1$ and $c_2$, through an XOR gate 328, as in FIG. 4.

Encoding Optical Differential 8-Level Phase Shift Keying

Figure 6:
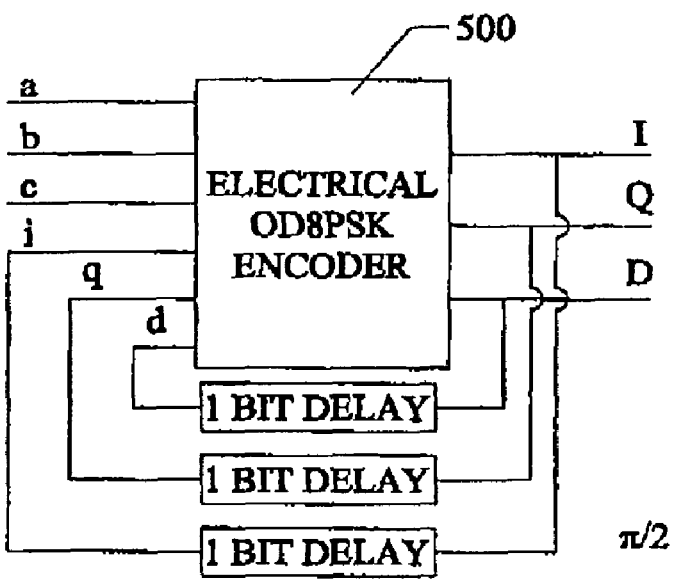
FIG. 6 is a schematic diagram of an electrical encoder according to a first embodiment of the invention for use in the system shown in FIG. 2.

The electrical encoder maps three independent data channels, a, b, and c, into three differentially-encoded data sequences I, Q and D as shown in the schematic diagram of FIG. 6. In the optical encoder, the encoded data sequences drive optical modulators to generate differentially-encoded optical signal at a symbol rate equal to the bit rate of each input data channel. After transmission through optical fiber, the differentially encoded optical signal is demodulated optically and the original data, a, b and c, are recovered by the receivers (detectors) with direct detection.

Figure 5:
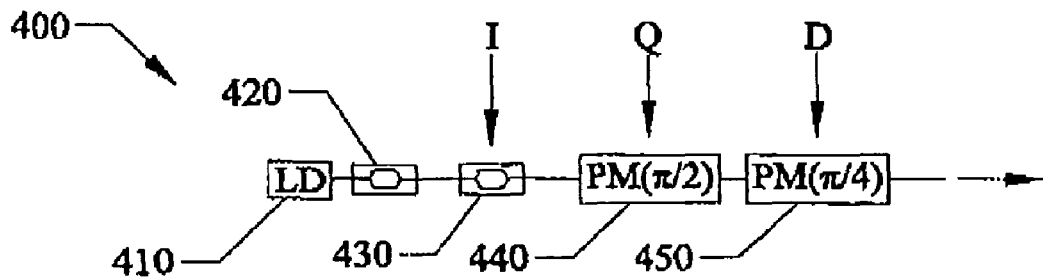
FIG. 5 is a diagram of a first embodiment of optical encoding eight different phases using three cascaded optical modulators.

Referring to FIG. 5, in a first embodiment, to encode OD8PSK on the optical carrier, generation of eight different phases whose differences are integer multiples of $\pi/4$ are required. In this first embodiment, eight different phases are encoded using three cascaded optical modulators as shown in FIG. 5. The modulator 420 after the source laser 410 is for return to zero pulse carving. For non-return to zero formats, the modulator 420 is not required. The first modulator 430 is a Mach-Zehnder (MZ) modulator biased at transmission null and driven by one (I) of the three encoded outputs of the electrical encoder 500 (FIG. 6) with a peak-to-peak voltage of approximately 2V, so that the encoded phase differences are 0 or $\pi$. The second and third modulators 440 and 450, respectively, are optical phase modulators with the encoded phase differences of 0 or $\pi/2$ and 0 or $\pi/4$, respectively.

The electrical encoder maps three independent data channels, a, b, and c, into three differentially-encoded data sequences, I, Q and D, to exactly recover the three original binary input data sequences with the optical encoding and demodulation scheme defined above. A schematic diagram of the electrical encoder 500 is shown in FIG. 6.

The logical equations of the electrical encoder 500 can be obtained by establishing a truth table for the encoding and applying standard Boolean algebra techniques, and are $$I=\bar{d}(i\bar{a}+\bar{i}a)\bar{q}+(\bar{d}q+d\bar{c})(i\bar{b}+\bar{i}b)+d[(i\bar{q}+\bar{i}q)\bar{a}+(iq+\bar{i}\bar{q})a]c$$

$$Q=[q\bar{c}+(q\bar{d}+\bar{q}d)c](ab+\overline{ab})+[\bar{q}c+(qd+\overline{qd})\bar{c}](a\bar{b}+\bar{a}b)$$

$$D=(d\bar{c}+\bar{d}c)(ab+\overline{ab})+(dc+\overline{dc})(a\bar{b}+\bar{a}b)$$

where the bar above the symbol indicates a logical inversion, I, Q, and D are output of the electrical encoder for a given set of input bits, a, b, and c, and i, q, and d are the output of the electrical encoder in the previous time slot (i.e. $i_k=I_{k-1}$, $q_k=Q_{k-1}$, and $d_k=D_{k-1}$).

Figure 7:
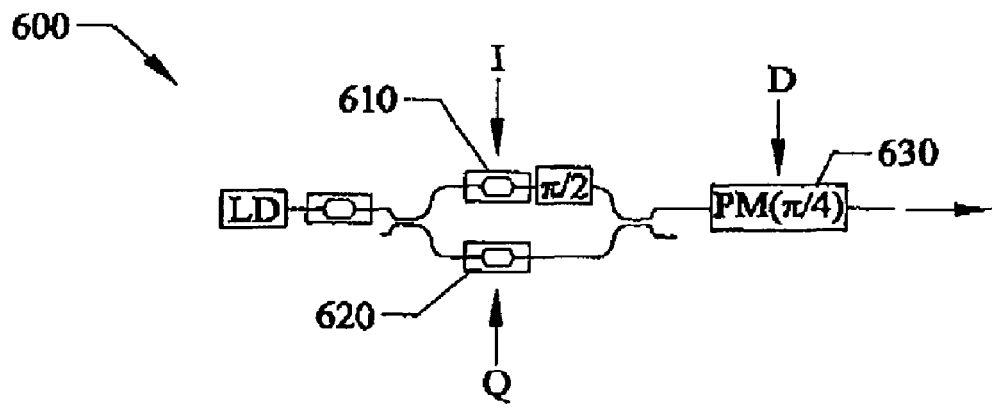
FIG. 7 is a diagram of a second embodiment of optical encoding using two Mach-Zehnder modulators in a Mach-Zehnder interferometer to cascade a phase modulator.

In the second embodiment, another method is used to produce eight different phases with differences that are integer multiple of $\pi/4$ using two MZ modulators 610, 620 in a MZ interferometer 600 and to cascade a phase modulator as shown in FIG. 7. The two MZ modulators 610, 620 are biased at transmission null and driven by I and Q, respectively, of three encoded outputs of the electrical encoder 500 (FIG. 6) with a peak-to-peak voltage of approximately 2V. The MZ interferometer 600 has differential phase of $\pi/2$ between two arms. The encoded output signals from the interferometer has a differential phase between successive bits of 0, $\pi/2$, $\pi$, or $3\pi/2$. The phase modulator 630 driven by D provides phase changes of 0, $\pi/4$.

The logical equation of the electrical encoder for the optical encoding method of the second embodiment is $$I=\bar{d}[i(\bar{q}a+q\bar{b})+\bar{i}(qa+\bar{i}b)]+d[(i\bar{b}+\bar{i}b)\bar{c}+(qa+\bar{q}a)c]$$

$$Q=\bar{d}[i(q\bar{a}+\bar{q}b)+\bar{i}(\bar{q}a+q\bar{b})]+d[(i\bar{a}+\bar{i}a)c+(q\bar{b}+\bar{q}b)\bar{c}]$$

$$D=(d\bar{c}+\bar{d}c)(ab+\overline{ab})+(dc+\overline{dc})(a\bar{b}+\bar{a}b)$$

Figure 8:
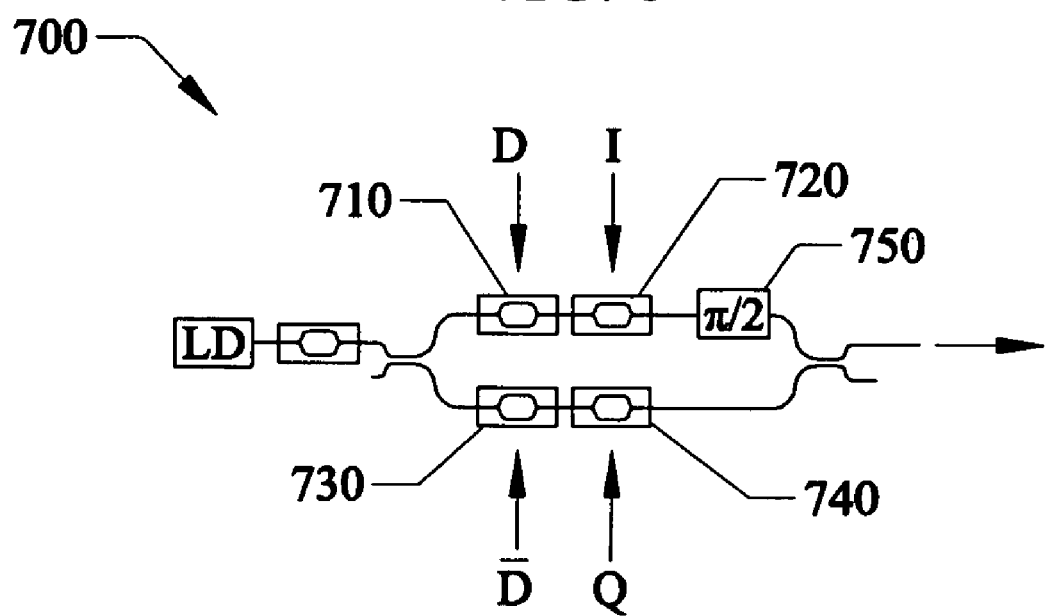
FIG. 8 is a diagram of a third embodiment of optical encoding using four Mach-Zehnder modulators in a Mach-Zehnder interferometer.

A third embodiment for optical OD8PSK encoding uses four modulators 710, 720, 730 and 740 in a MZ interferometer 700 as shown in FIG. 8. The MZ interferometer 700 also has differential phase 750 of $\pi/2$ between the two arms of the MZ Interferometer 700. The first MZ modulators 710, 730 in the upper and lower arms are biased at approximately $V_\pi/2$ and driven by D and $\bar{D}$, respectively, with a voltage of approximately $V_\pi/2$ so that the peak power ratio between the outputs from the two modulators is sin ($\pi/8$)/cos ($\pi/8$) or cos ($\pi/8$)/sin ($\pi/8$). The second MZ modulators 720, 740 in the upper and lower arms are biased at approximately $2V_\pi$ transmission null and driven by I and Q, respectively, of three encoded outputs of the electrical encoder with a peak-to-peak voltage of approximately $2V_\pi$.

The logical equations of the electrical encoder for the optical encoding method of the third embodiments are $$I=(i\overline{ab}+\bar{i}ab)\bar{c}+(\overline{qab}+q\overline{ab})c+[(id+\overline{qd})ab+(\bar{i}d+\overline{qd})\bar{a}\bar{b}]c+[(\bar{i}d+q\bar{d})a\bar{b}+(id+\overline{qd})\bar{a}b]\bar{c}$$

$$Q=(i\overline{ab}+\bar{i}ab)c+(\overline{qab}+q\overline{ab})\bar{c}+[(\bar{i}d+\overline{qd})ab+(id+q\bar{d})\bar{a}\bar{b}]c+[(\bar{i}d+q\bar{d})a\bar{b}+(id+\overline{qd})\bar{a}b]\bar{c}$$

$$D=[(i\bar{q}+\bar{i}q)(\bar{a}b+a\bar{b})+(id+\bar{i}d)(\overline{ab}+ab)]\bar{c}+[(\bar{i}q+iq)(\bar{a}\bar{b}+ab)+(qd+\overline{qd})(\overline{ab}+a\bar{b})]c$$

In summary, the preferred embodiment of the present invention includes an electrical encoder and an optical encoder for generation of differentially encoded 8-level phase-modulated optical signals and optical demodulators and balanced detectors for detection of the optical signals. The optical signals are transmitted through optical fiber links or air. The electrical encoder maps three independent data channels into three differentially-encoded data sequences. In the optical encoder, the encoded data sequences from the electrical encoder drive optical modulators to generate differentially-encoded 8-level phase modulated optical signals at a symbol rate equal to the bit rate of each input data channel. After transmission through optical fiber, the optical signals are demodulated optically and the original data are recovered by the balanced detectors with direct detection.

While optical differential 8-level phase-shift keying transmission system of the present invention has been described and illustrated using a particular coding scheme, the description is for illustration only and alternative coding schemes may be substituted. Those skilled in the art will recognize that plural coding methods are available and that the transmission efficiency would be greatly improved when used in conjunction with the optical differential 8-level phase-shift keying transmission system of the present invention.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. An optical differential 8-level phase-shift keying transmission system comprising:
    an encoder for differentially encoding a data sequence to produce a differentially encoded optical signal using optical differential 8-level phase shift keying said encoder comprising:
        an electrical encoder to encode said data sequence from an input data channel to produce a differentially-encoded binary data stream; and an optical phase modulator comprising a Mach Zehnder modulator biased at transmission null and driven with a peak-to-peak voltage of $2V_\pi$ for receiving said differentially-encoded binary data stream and modulating said differentially-encoded binary data stream on an optical carrier with an encoded phase difference of $\pi/4$;
    an optical transmission medium for transmitting said differentially encoded optical signal; and an optical demodulator and decoder for receiving said transmitted differentially encoded optical signal to recover said data sequence level.

2. The system of claim 1 wherein said electrical encoder comprises:
an encoder for encoding three synchronous binary input data streams a, b, c, into three differentially-encoded binary data streams I, Q, D, each said input data stream having a single bit period T between successive data bits.

3. The system of claim 2 wherein said encoder of said electrical encoder comprises:
a first time delay circuit for delaying $I_k$ by a period T to produce a first time-delayed encoded signal $i_{k+1}=I_k$;
a second time delay circuit for delaying $Q_k$ by a period T to produce a second time-delayed encoded signal $q_{k+1}=Q_k$;
a third time delay circuit for delaying $D_k$ by a period T to produce a second time-delayed encoded signal $d_{k+1}=D_k$ and
a logic circuit for producing differentially-encoded signals I, Q, and D according to the logical relationships:

$$I=\overline{d}(i\overline{a}+\overline{i}a)\overline{q}+(\overline{d}q+d\overline{c})(i\overline{b}+\overline{i}b)+d[(i\overline{q}+\overline{i}q)\overline{a}+(iq+\overline{iq})a]c$$

$$Q=[q\overline{c}+(q\overline{d}+\overline{q}d)c](ab+\overline{ab})+[\overline{q}c+(qd+\overline{q}\overline{d})\overline{c}](a\overline{b}+\overline{a}b)$$

$$D=(d\overline{c}+\overline{d}c)(ab+\overline{ab})+(dc+\overline{d}\overline{c})(a\overline{b}+\overline{a}b)$$

where a bar above a symbol indicates a logical inversion, I, Q, And D are output of the logic circuit for a given set of input bits a, b and c and i, q and d are a first output of the encoder in the previous time slot $i_k+I_{k-1}$, $q_k=Q_{k-1}$ and $d_k+D_{k-1}$.

4. The system of claim 3 wherein said optical phase modulator comprises:
an optical source for producing an optical output;
a first optical phase modulator coupled with the optical source and driven by the I output data stream from the encoder of the electrical encoder having one of an output phase difference of 0 and π for optically phase modulating the I differentially-encoded binary data stream;
a second optical phase modulator coupled with an output of the first optical phase modulator and drive by the Q output data stream from the encoder of the electrical encoder having one of an output phase difference of 0 and π/2 for optically phase modulating the Q differentially-encoded binary data stream; and
the Mach Zehnder modulator as a third optical phase modulator coupled with an output of the second optical phase modulator and drive by the D output data stream from the encoder of the electrical encoder having one of an output phase difference of 0 and π/4 for optically phase modulating the D differentially-encoded binary data stream, the first, second and third optical phase modulators generating a differentially encoded 8-level phase-modulated optical signal for transmission over the optical transmission medium.

5. The system of claim 2 wherein said encoder of said electrical encoder further comprises:
a first time delay circuit for delaying $I_k$ by a period T to produce a first time-delayed encoded signal $i_{k+1}=I_k$;
a second time delay circuit for delaying $Q_k$ by a period T to produce a second time-delayed encoded signal $q_{k+1}=Q_k$;
a third time delay circuit for delaying $D_k$ by a period T to produce a second time-delayed encoded signal $d_{k+1}=D_k$ and
a logic circuit for producing differentially-encoded signals I, Q, and D according to the logical relationships:

$$I=\overline{d}[i(\overline{q}a+q\overline{b})+\overline{i}(qa+\overline{q}b)]+d[(i\overline{b}+\overline{i}b)\overline{c}+(qa+\overline{q}a)c]$$

$$Q=\overline{d}[i(q\overline{a}+\overline{q}b)+\overline{i}(\overline{q}a+q\overline{b})]+d[(i\overline{a}+\overline{i}a)c+(q\overline{b}+\overline{q}b)\overline{c}]$$

$$D=(d\overline{c}+\overline{d}c)(ab+\overline{ab})+(dc+\overline{d}\overline{c})(a\overline{b}+\overline{a}b)$$

where a bar above a symbol indicates a logical inversion, I, Q, and D are output of the logic circuit for a given set of input bits a, b and c and i, q and d are a first output of the encoder in the previous time slot $i_k+I_{k-1}$, $q_k=Q_{k-1}$ and $d_k+D_{k-1}$.

6. The system of claim 5 wherein said optical phase modulator comprises:
an optical source for producing an optical output;
a second Mach Zhender interferometer coupled with an output of the optical source having a phase shift of π/2 between a first arm and a second arm of said interferometer, comprising;
a first optical phase modulator driven by the differentially-encoded I binary data stream with one of an output phase difference of 0 and π on a first arm of the interferometer;
a second optical phase modulator driven by the differentially-encoded Q binary data stream with one of an output phase difference of 0 and π on a second arm of the interferometer; and
the first Mach Zehnder modulator as a third optical phase modulator driven by the differentially-encoded D binary data stream with one of an output phase difference of 0 and π/4, the first second and third optical phase modulators generating a differentially encoded 8-level phase modulated optical signal.

7. The system of claim 1 wherein said electrical encoder comprises:
an encoder for encoding three synchronous binary input data streams a, b, c, into three differentially-encoded binary output data streams I, Q, D, each said input data stream having a single bit period T between successive data bits;
a first time delay circuit for delaying $I_k$ by a period T to produce a first time-delayed encoded signal $i_{k+1}=I_k$;
a second time delay circuit for delaying $Q_k$ by a period T to produce a second time-delayed encoded signal $q_{k+1}=Q_k$;
a third time delay circuit for delaying $D_k$ by a period T to produce a second time-delayed encoded signal $d_{k+1}=D_k$;
a logic circuit for inverting the differentially-encoded binary output data stream D to produce $\overline{D}$ and
said encoder consisting essentially of a logic circuit for producing differentially-encoded binary signals I, Q, and D according to the logical relationships:

$$I=[(\overline{q}ab+qa\overline{b})+(id+q\overline{d})ab+(\overline{i}d+\overline{q}d)\overline{ab}]c$$

$$+[(i\overline{ab}+\overline{i}ab)+(\overline{i}d+q\overline{d})a\overline{b}+(id+\overline{q}d)\overline{a}b]\overline{c}$$

$$Q=[(ia\overline{b}+\overline{i}ab)+(\overline{i}d+q\overline{d})ab+(id+\overline{q}d)\overline{ab}]c$$

$$+[(\overline{q}ab+q\overline{ab})+(\overline{i}d+q\overline{d})a\overline{b}+(id+\overline{q}d)\overline{a}b]\overline{c}$$

$$D=[(i\overline{q}+iq)(\overline{ab}+ab)+(qd+\overline{q}\overline{d})(\overline{a}b+a\overline{b})]c+[(iq+\overline{iq})(\overline{a}b+a\overline{b})+(id+\overline{i}d)(\overline{ab}+ab)]\overline{c}$$

where a bar above a symbol indicates a logical inversion, I, Q, and D are output of the logic circuit for a given set of input bits a, b and c and i, q and d are a first output of the encoder in the previous time slot $i_k+I_{k-1}$, $q_k=Q_{k-1}$ and $d_k+D_{k-1}$.

8. The system of claim 7 wherein said Mach Zehnder modulator comprises:
a phrase shift of π/2 between a first arm and a second arm of said interferometer coupled with an output of the encoder, the MZ interferometer further comprising:

a first optical intensity modulator biased at $V_\pi/2$ and driven by the differentially-encoded binary signal D having a peak power ratio between outputs from the modulator of sin $(\pi/8)$/cos $(\pi/8)$ and cos $(\pi/8)$/sin $(\pi/8)$ serially connected with a first optical phase modulator driven by the differentially-encoded binary signal I with one of an output phase difference of 0 and $\pi$ on said first arm of the interferometer to produce a first output optical signal;

a second optical intensity modulator biased at $V_\pi/2$ and driven by the differentially-encoded binary signal $\overline{D}$ with a peak power ratio between outputs from the modulator of sin $(\pi/8)$/ cos $(\pi/8)$ and cos $(\pi/8)$/sin serially connected with a second optical phase modulator drive by the differentially-encoded binary signal Q with one of an output phase difference of 0 and $\pi$ on said second arm of the interferometer to produce a second output optical signal.

9. The system of claim 1 wherein said decoder comprises: a balanced detector.

10. The system of claim 1 wherein said optical demodulator comprises:

a first optical 3 dB coupler for receiving and dividing said differentially encoded optical signal into a first and a second optical signal;

a second optical 3 dB coupler for dividing one of the first and the second optical signals from the first optical 3 dB coupler into a third and a fourth optical signal;

a third optical 3 dB coupler for dividing the other one of the first and the second optical signals from the first optical 3 dB coupler into a fifth and a sixth optical signal;

a first one-bit delayed MZ interferometer having one of a $-\pi/8$ phase shift between a first arm and a second arm and a second arm of said first one-bit delayed MZ interferometer to demodulate said third optical signal;

a second one-bit delayed MZ interferometer having one of a $3\pi/8$ phase shift between a first arm and a second arm of said second one-bit delayed MZ interferometer to demodulate said fourth optical signal;

a third one-bit delayed MZ interferometer having one of a $\pi/8$ phase shift between a first arm and a second arm of said third one-bit delayed MZ interferometer to demodulate said fifth optical signal; and a fourth one-bit delayed MZ interferometer having one of a $-3\pi/8$ phase shift between first arm and a second arm of said fourth on-bit delayed MZ interferometer to demodulate said sixth optical signal.

11. The system of claim 10 where said decoder comprises a detector comprising:

a first and a second receiver for receiving said demodulated third and fourth optical signal from said first and said second one-bit delayed Mach-Zehnder interferometer, respectively, to recover a first and a second bit of said data sequence;

a third and a fourth receiver for receiving said demodulated fifth and sixth optical signal from said third and fourth one-bit delayed Mach-Zehnder interferometer, respectively, to produce a first and a second output data; and an XOR gate for receiving said first and said second output data to recover a third bit of said data sequence.

12. The system of claim 9 wherein said optical demodulator comprises:

an optical 3 dB coupler for dividing said differentially encoded optical signal into a first and a second optical signal;

a first one-bit delayed Mach Zehnder demodulator for optically demodulating said first optical signal to produce a first demodulated signal, said first one-bit delayed Mach-Zehnder demodulator having a phase shift of approximately $-\pi/8$; and a second one-bit delayed Mach Zehnder demodulator for optically demodulating said second optical signal to produce a second demodulated signal, said second one-bit delayed Mach-Zehnder demodulator having a phase shift of approximately $3\pi/8$.

13. The system of claim 12 wherein said detector comprises:

a first receiver for receiving said first demodulated signal to recover a first bit of said data sequence;

a second receiver for receiving said second demodulated signal to recover a second bit of said data sequence;

an electrical adder to generate electrical signal of addition of first bit and second bit from said first and said second receiver, respectively;

an electrical subtractor to generate electrical signal of subtraction of said first bit and second bit from said first and said second receiver, respectively; and an electrical XOR gate to generate a third bit of said data sequence with electrical output signals of said electrical adder and said electrical subtractor.

14. The system of claim 1 said encoder further comprising:

an electrical encoder to encode said data sequence from an input data channel to produce an encoded binary data stream; and an optical phase modulator for receiving said differentially-encoded binary data stream and modulating said encoded binary data stream on an optical carrier with an encoded phase difference of $\pi/4$.

15. An optical differential 8-level phase-shift keying transmission system comprising:

an encoder for differentially encoding a data sequence to produce a differentially encoded optical signal using optical differential 8-level phase shift keying;

an optical transmission medium for transmitting said differentially encoded optical signal; and an optical demodulator and decoder for receiving said transmitted differentially encoded optical signal to recover said data sequence, said optical demodulator for optically demodulating said differentially encoded optical signal and a balanced detector to recover said data sequence from said demodulated differentially encoded optical signal, said optical demodulator comprising:

an optical 3 dB coupler for dividing said differentially encoded optical signal into a first and a second optical signal;

a first one-bit delayed Mach Zehnder demodulator for optically demodulating said first optical signal to produce a first demodulated signal, said first one-bit delayed Mach-Zehnder demodulator having a phase shift of approximately $-\pi/8$; and a second one-bit delayed Mach Zehnder demodulator for optically demodulating said second optical signal to produce a second demodulated signal, said second one-bit delayed Mach-Zehnder demodulator having a phase shift of approximately $3\pi/8$.

16. The transmission system of claim 15 wherein said detector comprises:

a first receiver for receiving said first demodulated signal to recover a first bit of said data sequence;

a second receiver for receiving said second demodulated signal to recover a second bit of said data sequence;

an electrical adder to generate electrical signal of addition of first bit and second bit from said first and said second receiver, respectively;

an electrical subtractor to generate electrical signal of subtraction of said first bit and second bit from said first and said second receiver, respectively; and an electrical XOR gate to generate a third bit of said data sequence with electrical output signals of said electrical adder and said electrical subtractor.

* * * * *